INVENTOR.
WILLIAM J. PRITCHARD,
BY Herman Seid
ATTORNEYS.

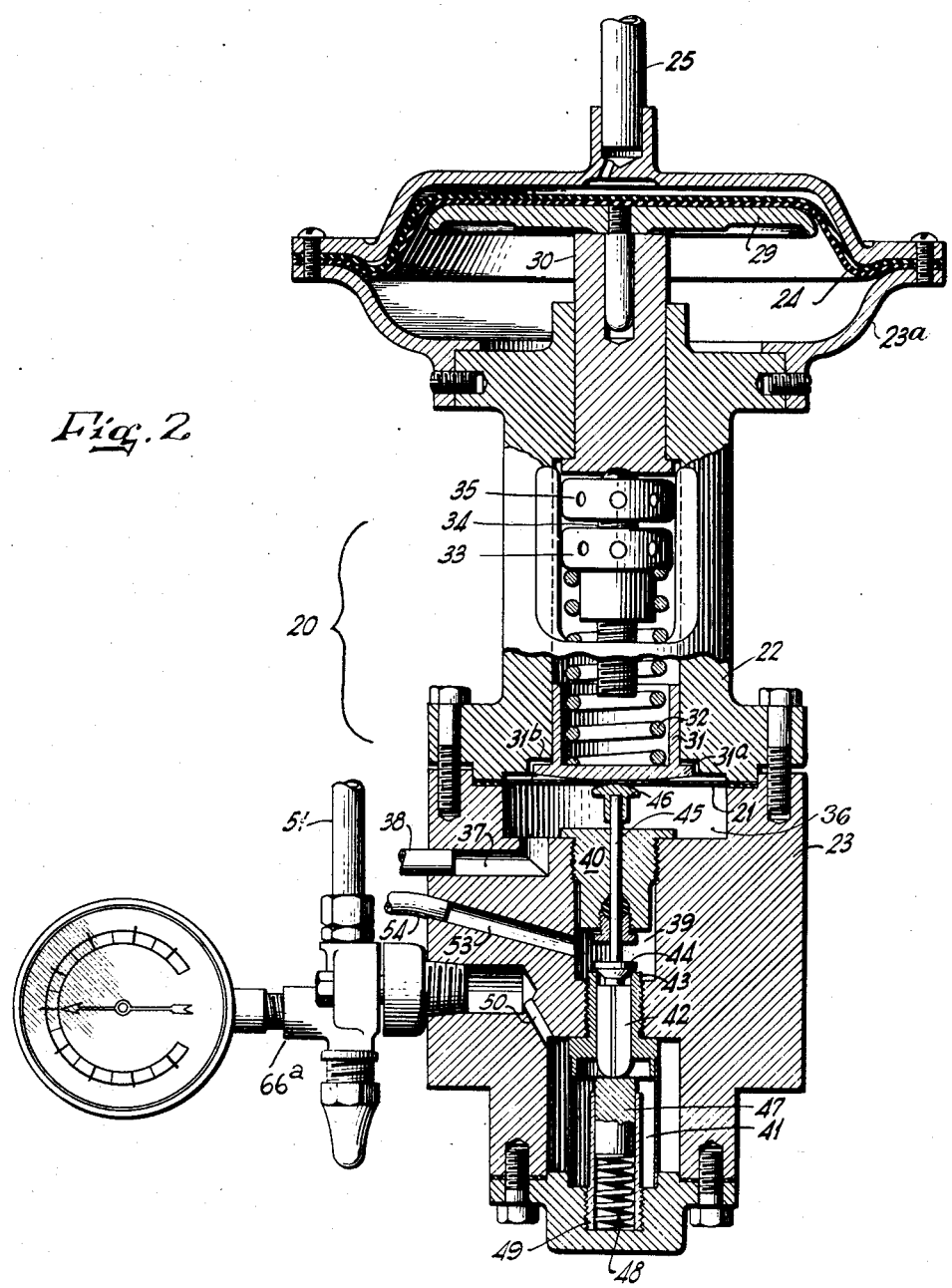

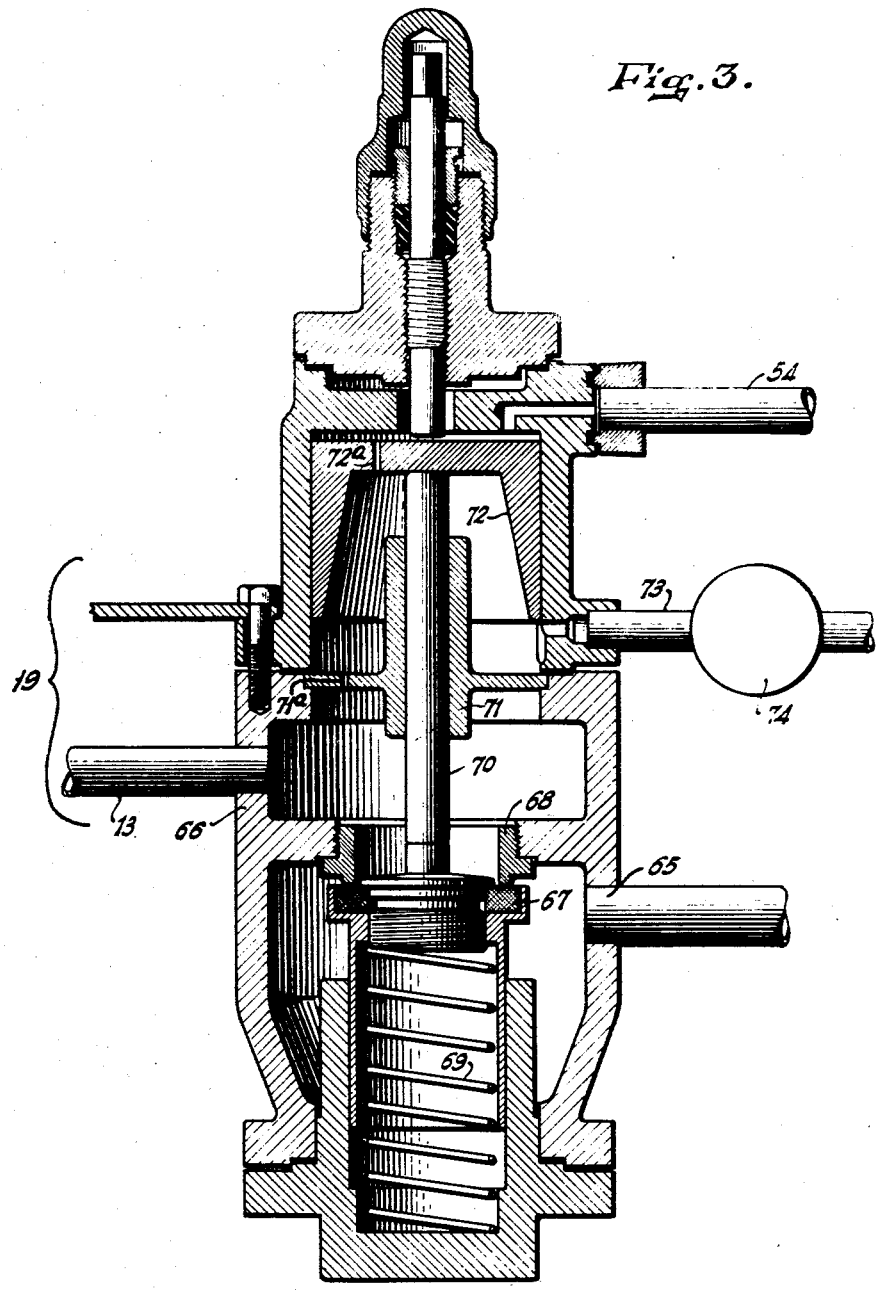

Patented June 6, 1939

2,161,312

UNITED STATES PATENT OFFICE 2,161,312

REFRIGERATING APPARATUS CONTROL

William J. Pritchard, Milford, Conn., assignor to Carrier Corporation, Newark, N. J., a corporation of Delaware Application January 26, 1937, Serial No. 122,337

10 Claims. (Cl. 62—8)

This invention relates to refrigeration, and more particularly, to a method of and means for controlling the operation of refrigerating systems of the direct expansion type.

The general object of the invention is to provide a method of and means for controlling the operation of refrigerating apparatus of the direct expansion type, whereby the temperature of the conditioned medium leaving the evaporator of said apparatus may be maintained at a predetermined point regardless of variations in heat load on the evaporator.

It is another object of the invention to provide an improved method of and apparatus for regulating the back pressure of a direct expansion refrigerant evaporator to maintain substantially constant a characteristic, such as the temperature, of a medium conditioned by said evaporator.

It is another object of the invention to control the temperature of medium passed in contact with a direct expansion refrigerant evaporator, by regulating the temperature at which said evaporator operates in accordance with variations in heat load.

As used in air conditioning systems, the invention is especially well adapted to maintain a desired constant dewpoint of air leaving a conditioner casing equipped with direct expansion refrigerant coils. The invention is not limited to such use, however, but lends itself to a wide variety of applications. For example, the dry bulb thermal element, which comprises a part of the apparatus when used for dewpoint control, may be replaced by a hygrostat responsive to changes in relative humidity in an enclosure conditioned by a bypass air conditioning system. In a preferred embodiment of such a system, proportioning of air between the conditioning chamber and the bypass would be controlled by a dry bulb thermostat responsive to changes in temperature in the conditioned enclosure, while the humidity in the enclosure would be regulated by the hygrostat controlling the back pressure within the direct expansion evaporator coils of the conditioning chamber.

The invention also finds application in providing an exact control for liquid temperatures. In the dispensing of beer in chemical plants, and in many other applications, it is of vital importance to maintain liquid temperatures within very narrow limits. The present invention provides such control in substantially the same way that it controls the dewpoint of air when the invention is employed in an air conditioning system, i. e., by controlling the back pressure within a direct expansion evaporator with which the liquid is passed in contact.

Another object of the invention is to provide a method of and means for controlling refrigerating apparatus including a direct expansion evaporator which are essentially simple but which effect prompt and precise control.

A feature of the invention resides in controlling the operation of refrigerating apparatus including a direct expansion evaporator by providing a back pressure regulating valve in the suction line leading from the evaporator and regulating the degree of opening of said valve in accordance with variations in the temperature of air or other fluid leaving the evaporator after having contacted therewith.

Another feature of the invention resides in providing a valve in the gas suction line of a direct expansion evaporator, said evaporator comprising a part of a refrigerating system including a compressor and a condenser, and controlling the operation of said valve by means of a pilot or auxiliary valve, said pilot valve being controlled in accordance with changes in back pressure within said evaporator and in accordance with changes in the temperature of fluid which has been passed in contact with said evaporator.

Other objects, features and advantages of the invention will be more apparent from the following description to be read in connection with the accompanying drawings, in which Fig. 1 illustrates diagrammatically a refrigerating apparatus control system in accordance with the invention;

Fig. 2 is a vertical section through the auxiliary valve of Fig. 1;

Fig. 3 is a vertical section through the back pressure regulating valve of Fig. 1.

Figure 1:
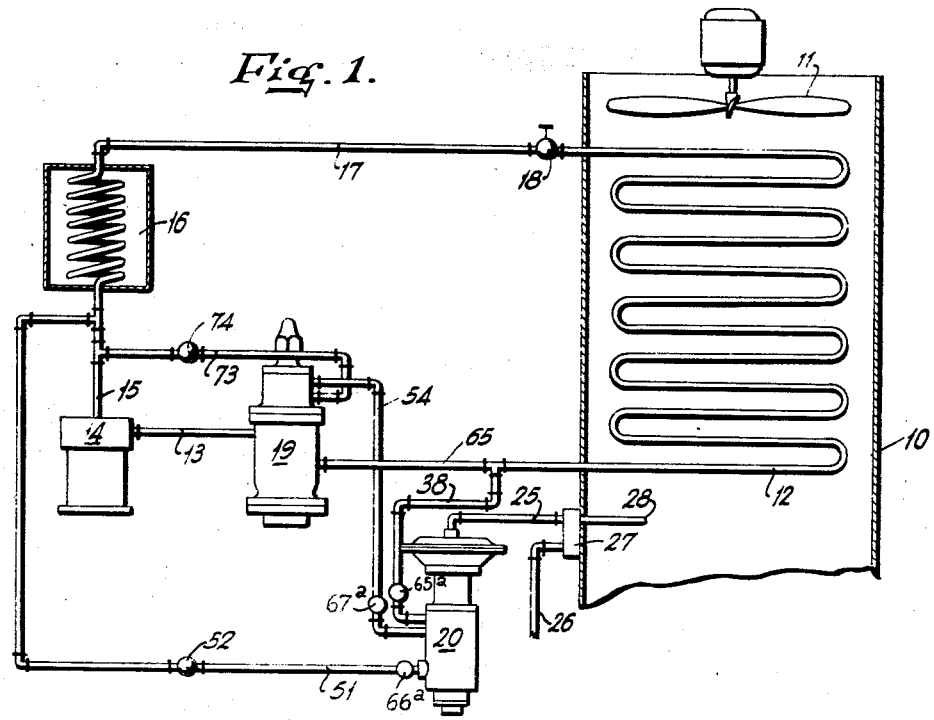

Referring to the drawings, numeral 10 designates the casing of an air conditioning unit through which air is circulated by a fan 11 in contact with direct expansion evaporator coil 12. Expanded refrigerant is withdrawn from evaporator 12 through suction line 13 and is supplied thereby to compressor 14. Compressed refrigerant is supplied through line 15 to condenser 16, whence liquefied refrigerant is supplied to evaporator 12 through liquid line 17 provided with expansion valve 18. In the suction line 13 leading to the compressor is provided a back pressure regulating valve 19.

Valve 19 may be of any desired type or design, but preferably is of the form illustrated in Fig. 3. The lower portion of the valve is provided with an inlet from the evaporator, designated 65, and an outlet to suction line 13, designated 66. Flow from 65 to 66 is restricted by valve closure member 67, urged toward valve seat member 68 by spring 69. Valve stem 70 extends upwardly through partition member 71, and carries a piston 72, for which the upper part of valve 19 serves as a cylinder.

Line 54 is adapted to supply fluid under pressure to the upper side of piston 72. The control of pressure in line 54 is described in detail below. But it is to be understood that when the pressure in line 54 increases, the piston 72, and hence the valve closure member 67, are forced downwardly to increase the valve opening; and when the pressure in line 54 is reduced, the piston 72 and the valve closure member 67 are forced upwardly by spring 69, to reduce the valve opening. Leak ports 72a and 71a are preferably provided in the piston 72 and the partition member 71. To provide for smooth operation of the valve 19, a preferred embodiment of the invention includes a line 73 leading from compressed gas line 15 and including a pressure reduction valve 74 (of a type well-known in the art and hence requiring no detailed description here), for maintaining a constant pressure in the area between the piston 72 and the partition member 71.

When valve 19 is open to a relatively wide degree, it permits relatively unimpeded withdrawal of refrigerant gas from the evaporator 12. Hence the back pressure within the evaporator is relatively low and this in turn means that the temperature obtaining in the evaporator will be relatively low. When the valve 19 is moved towards closed position, the withdrawal of refrigerant gas from the evaporator 12 is impeded; consequently, pressure in the evaporator is raised and hence also the temperature of the evaporator is raised. It will thus be seen that by controlling the degree of opening of valve 19 it is possible to control the temperature of air leaving the casing 10. It is to be understood that while this description of the invention specifically refers to air conditioning, the invention may be utilized with equal advantage whenever gases or liquids of any type are circulated in thermal contact with the surfaces of a direct expansion evaporator coil.

The numeral 20 designates generally an auxiliary or pilot valve, illustrated in Fig. 2, used to control the valve 19. Broadly, the valve 20 comprises two sections separated by a diaphragm 21, the upper section of the valve being designated 22 and the lower section of the valve being designated 23. The upper valve portion 22 is provided with a flanged section 23a within which a diaphragm 24 is contained. Control line 25 is connected to the top of section 23 and pressure transmitted through line 25 is exerted downwardly against diaphragm 24. Control line 25 is supplied with compressed air from compressed air supply line 26. The pressure in line 25 is controlled by thermal control apparatus 27, the thermal element of which, 28, is positioned in the path of air leaving the evaporator 12. Many varieties of apparatus, such as 27, are well known in the art and may be employed in carrying out the invention. Preferably, however, control apparatus 27 is of the type (well-known in the art and therefore not requiring detailed description here) which is adapted to decrease the air pressure in line 25 when there is a rise in the temperature to which thermal element 28 is subjected.

Underneath the diaphragm 24 is mounted a disk 29, carried on element 30 vertically movable within valve section 22. Mounted on the upper side of diaphragm 21 and within the valve section 22 is a cup 31 within which spring 32 is housed. Carried on the top of spring 32 is a spring cap 33 having a threaded extension 34. A nut 35 is adjustably carried on extension 34, and supports element 30. As will be apparent, increased pressure in line 25 is transmitted through diaphragm 24, disk 29, element 30 and elements 31—35, and tends to depress the diaphragm 21.

Formed within valve section 23 immediately beneath diaphragm 21 is chamber 36 which communicates by passage 37 and line 38 with the evaporator outlet. Thus, the pressure obtaining in chamber 36 is substantially equal to that obtaining in the evaporator. The pressure in chamber 36 tends to raise diaphragm 21. To limit the upward motion of diaphragm 21, the cup 31 is provided with flange 31a, recessed within annular channel 31b.

Within the central portion of section 23 is formed a chamber 39, separated from chamber 36 by element 40. Formed within the lower portion of valve section 23 is a chamber 41 adapted to communicate with chamber 39 through channel 42. Member 43 provides a valve seat with which valve closure member 44 is adapted to cooperate. Thus, valve closure member 44 is adapted to control fluid flow from chamber 41 to chamber 39. Valve closure member 44 is carried on valve stem 45, which extends upwardly through suitable packing in member 40 and terminates in element 46 abutting the underside of diaphragm 21. The lower extremity of valve stem 45 abuts element 47 carried on spring 48. Both element 47 and spring 48 are disposed within a suitable guide member 49.

Channel 50 and line 51 provide communication between pressure reduction valve 52 and chamber 41. Valve 52 is in turn connected to the compressed gas line 15. Pressure reduction valve 52 is of the type adapted to maintain a constant pressure in line 51 and hence in chamber 41. Chamber 39 communicates through channel 53 and line 54 with back pressure regulating valve 19 in the refrigerant suction line 13. Valve 19 may be of any desired type or construction, but preferably is of that type, as described above, in which increased pressure in line 54 operates to increase the opening of the valve.

Assuming an increase in heat load on the evaporator, operation of the system will be as follows: The increase in heat load will result in a temporary slight increase in the temperature of air contacting thermal element 28. This will cause decreased air pressure in line 25. Thus, temporarily, the pressure exerted upwardly against diaphragm 21 will be greater than the downward pressure exerted on diaphragm 21, as above described. Thus, diaphragm 21 will be moved upwardly and valve closure member 44 will be caused by spring 48 to follow the upward movement of the diaphragm 21. Thus, the closure member 44 will be further removed from its seat to permit increased flow from chamber 41 to the chamber 39 and thence to line 54. As the pressure in line 54 increases, the valve 19 is further opened, thus reducing the back pressure and, correspondingly, the temperature in the evaporator to accommodate the increase in load reflected by the thermal element 28. As the back pressure is lowered, the pressure in chamber 36 will be correspondingly lowered and diaphragm 21 will tend to move downwardly, thus tending to lower the valve closure member 44, to further restrict flow from chamber 41 to chamber 39 and thus to decrease the pressure in line 54. The diaphragm 21 will continue to "hunt" until proper balance of the opposed forces operating on it is established, that is, until there has been established a proper balance between back pressure in the evaporator and the heat load to which the evaporator is subjected. This "hunting" is of very short duration, and it may be said that control is effected almost instantaneously.

Conversely, when there is a decrease in heat load on the evaporator, a greater pressure in line 25 is provided. This will force the diaphragm 21 downwardly thus further to restrict communication between chambers 41 and 39, thus to lower the pressure in line 54 and thus to close somewhat the suction valve 19. The evaporator temperature will be raised, therefore, in accordance with the decrease in heat load.

To raise the evaporating pressure range through which the system operates, the nut 35 may be turned on threaded extension 34 to increase the separation between nut 35 and cap 33. To lower the evaporating pressure range, the nut 35 will be turned in the reverse direction.

If desired, suitable pressure gauges and valves may be provided in lines 38, 51, and 54, as indicated at 65a, 66a, and 67a, respectively.

It may be noted that the expansion valve 18, adapted to be used in connection with the invention, is of the constant pressure type. Once the expansion valve has been suitably adjusted it remains untouched, the adaptation of the refrigerating system to changes in heat load being effected by means of the control system hereinbefore described.

The thermo-responsive element 28 may be replaced by a humidity-responsive element, if humidity control is desired.

While the invention has been described in connection with a compressed air line for exerting upon the diaphragm 21 a varying pressure reflecting changes in heat load, it will be apparent to those skilled in the art that thermo-responsive electrical control means, well known in the art, may be used to perform this function. Since such apparatus is familiar and does not per se form part of the invention, it is not deemed necessary to describe the same in detail.

If desired, the invention may be utilized in systems involving indirect heat exchange. Thus, the expansion coils may cool water or brine which is sprayed or otherwise passed in heat exchange relation with air to be conditioned, a back pressure valve in the gas suction line being controlled in response to changes in the temperature of air treated by the cooled water or brine. Accordingly, in the claims, the expressions "in thermal contact" and "in heat exchange relation" shall be understood to refer to such indirect heat transfer as well as to cases in which the medium to be conditioned is passed in physical contact with the expansion coils.

Figure 4:
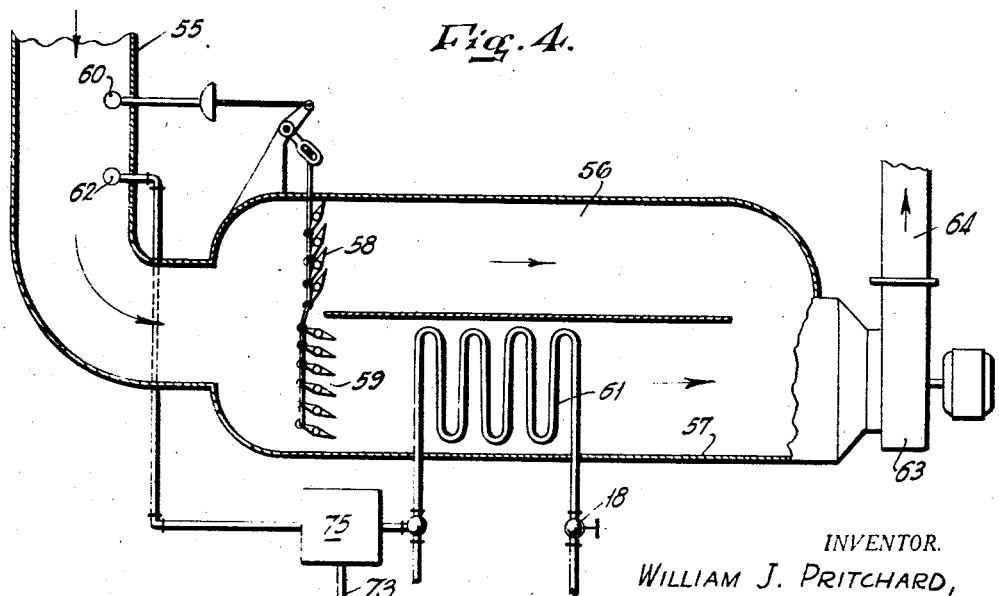
Fig. 4 illustrates diagrammatically a bypass air conditioning system to which the invention is applied.

Fig. 4 illustrates a manner in which the invention may be utilized in connection with a bypass air conditioning system. Return air duct 55 is adapted to supply air to bypass 56 and conditioner casing 57. Dampers 58 controlling the admission of air to bypass 56 and dampers 59 controlling the admission of air to conditioner casing 57 are differentially connected, so that as the air volume routed through the bypass is increased, correspondingly less air is routed through the conditioner casing and vice-versa. The position of differentially connected dampers 58 and 59 is controlled in response to changes in the dry bulb temperature of return air, as reflected by a dry bulb thermostat 60 positioned within the return air duct and controlling the position of dampers 58 and 59. An evaporator coil 61 positioned within conditioner casing 57 is controlled by hygrostat 62 in the return air duct in exactly the same way that evaporator 12 is controlled by thermal element 28 as described above. In Fig. 4 the control apparatus diagrammatically indicated as 75 for convenience, corresponds to and includes all of the elements for controlling the back pressure valve which are described above and illustrated in detail in Figs. 1, 2 and 3. Air is withdrawn from bypass 56 and conditioning chamber 57 by fan 63 and is returned to the enclosure to be conditioned through duct 64. It will be noted that the dry bulb temperature of the conditioned enclosure is maintained at a desired point by varying the proportions of bypassed and conditioned air, and that the humidity in the conditioned enclosure is maintained at a desired point by controlling the pressure within the evaporator coil with which the conditioner casing is equipped.

Since many modifications may be made in the invention without departing from the scope thereof, it is intended that all matter described in the foregoing specification and illustrated in the accompanying drawings be regarded as illustrative only and not in a limiting sense, applicant limiting himself only as indicated in the following claims.

I claim:

1. In an apparatus of the character described, an evaporator coil, means for supplying refrigerant to said coil, a compressor for withdrawing refrigerant from said coil, a back pressure regulating valve connected between the outlet from said coil and the inlet to said compressor, a pressure line connected to said valve and adapted to regulate the degree of opening thereof, and means for controlling the pressure in said line in accordance with changes in the leaving temperature of medium passed in thermal contact with said coil and in accordance with changes in the refrigerant pressure in said evaporator.

2. In an apparatus of the character described, an evaporator coil, means for supplying refrigerant to said coil, a compressor for withdrawing refrigerant from said coil, a back pressure regulating valve connected between the outlet from said coil and the inlet to said compressor, a pressure line connected to said valve and adapted to control the operation of said back pressure regulating valve, and means for controlling the pressure in said line, said pressure control means including a second valve, and means for regulating the position of said second valve in accordance with changes in the leaving temperature of medium passed in thermal contact with said coil and in accordance with changes in the refrigerant pressure in said coil.

3. In an apparatus of the character described, an evaporator coil, means for supplying refrigerant to said coil, a compressor for withdrawing refrigerant from said coil, a back pressure regulating valve adapted to control the withdrawal of refrigerant from said coil to said compressor, a pressure line arranged to control the operation of said back pressure regulating valve, a diaphragm, means for exerting on one side of said diaphragm a pressure varying in accordance with changes in the leaving temperature of medium passed in thermal contact with said evaporator coil, means for exerting on the other side of said diaphragm a pressure varying in accordance with changes in refrigerant pressure in said coil, and means responsive to the movement of said diaphragm for controlling the pressure in said pressure control line.

4. In an apparatus of the character described, an evaporator coil, means for supplying refrigerant to said coil, a compressor for withdrawing refrigerant from said coil, a back pressure regulating valve adapted to control the withdrawal of refrigerant gas from said coil to said compressor, means including a pressure line for controlling the operation of said valve, means including said compressor for creating fluid pressure within said pressure line, and means for regulating the pressure in said pressure line in accordance with changes in the leaving temperature of medium passed in thermal contact with said coil and in accordance with changes in the refrigerant pressure in said coil.

5. In an apparatus of the character described, an evaporator, means for supplying refrigerant to said evaporator, a compressor adapted to withdraw refrigerant from said evaporator, a back pressure regulating valve connected between the outlet from said evaporator and the inlet to said compressor, a pressure line connected to said valve and adapted to regulate the degree of opening thereof responsive to changes in pressure in said line, and means for controlling the pressure in said line in accordance with changes in a characteristic of a medium which has been in thermal contact with said evaporator and in accordance with changes in an operating condition of said evaporator.

6. In an apparatus of the character described, an evaporator coil, means for subjecting to thermal contact with said coil a medium from which heat is to be abstracted, means for supplying volatile refrigerant to said coil, a compressor adapted to withdraw refrigerant from said coil, a back pressure regulating valve adapted to control the withdrawal of refrigerant gas from said coil and connected between said coil and said compressor, a pressure line connected to said valve and adapted to control the operation of said back pressure regulating valve, and means for controlling the pressure in said line, said pressure control means including a second valve, and means for regulating the degree of opening of said second valve in accordance wtih changes in a characteristic of medium which has been in thermal contact with said coil and in accordance with changes in an operating condition of said evaporator coil.

7. In an apparatus of the character described, an evaporator coil, means for subjecting to thermal contact with said coil a medium from which heat is to be abstracted, means for supplying volatile refrigerant to said coil, a compressor adapted to withdraw refrigerant from said coil, a back pressure regulating valve adapted to control the withdrawal of refrigerant gas from said coil and connected between said coil and said compressor, a pressure line connected between the discharge side of said compressor and said valve and adapted to control the operation of said back pressure regulating valve, and means for controlling the pressure in said line, said pressure control means including second valve means in said pressure line, and means for regulating the degree of opening of said second valve means in accordance with changes in a characteristic of medium which has been in thermal contact with said coil and in accordance with changes in an operating condition of said coil.

8. Refrigerating apparatus including a refrigerant evaporating means for cooling a medium, a refrigerant compressor and a refrigerant condenser for supplying liquid refrigerant to and for withdrawing evaporated refrigerant from the evaporating means, valve means for controlling the withdrawal of evaporated refrigerant from said evaporating means, an adjustable member, means for exerting upon said adjustable member in a first direction a force which is decreased responsive to a rise in temperature of said medium and increased in response to a decrease in the temperature of said medium, means for exerting upon said adjustable member an opposing force in an opposite direction which increases responsive to increases in the pressure of evaporated refrigerant within the evaporating means and which decreases responsive to decreases in the pressure of refrigerant within the evaporating means, said adjustable member being adjusted under the influence and control of said opposing forces, and means responsive to the adjustment of said adjustable member for controlling the operation of said valve means.

9. The method of regulating a refrigerating system including a direct expansion evaporator coil, a back pressure regulating valve and a compressor which consists in subjecting said valve to a substantially constant regulating force developed responsive to operation of said compressor, and controlling the effect of said regulating force upon said valve in accordance with changes in the leaving temperature of medium passed in thermal contact with said evaporator coil and in accordance with changes in the refrigerant pressure in said evaporator coil.

10. In an apparatus of the character described, an evaporator, means for subjecting to thermal contact with said coil a medium from which heat is to be abstracted, means for supplying volatile refrigerant to said evaporator, a compressor adapted to withdraw refrigerant from said evaporator, a back pressure regulating valve adapted to control the withdrawal of refrigerant gas from said evaporator and connected between said evaporator and said compressor, means tending to regulate the degree of opening of said back pressure regulating valve responsive to pressure resulting from operation of said compressor, and means tending to control the degree of opening of said back pressure regulating valve and working in opposition to said first-mentioned valve control means, said last-mentioned means being controlled in accordance with changes in a characteristic of medium which has been in thermal contact with said evaporator and in accordance with changes in an operating condition of said evaporator.

WILLIAM J. PRITCHARD.